No. 887,184. PATENTED MAY 12, 1908.
C. A. BREWER.
UNIVERSAL JOINT.
APPLICATION FILED AUG. 23, 1907.

2 SHEETS—SHEET 1.

Witnesses:
H. A. Lamb.
S. W. Atherton.

Inventor
Charles A. Brewer
By Attorney
A. M. Wooster

No. 887,184. PATENTED MAY 12, 1908.
C. A. BREWER.
UNIVERSAL JOINT.
APPLICATION FILED AUG. 23, 1907.
2 SHEETS—SHEET 2.
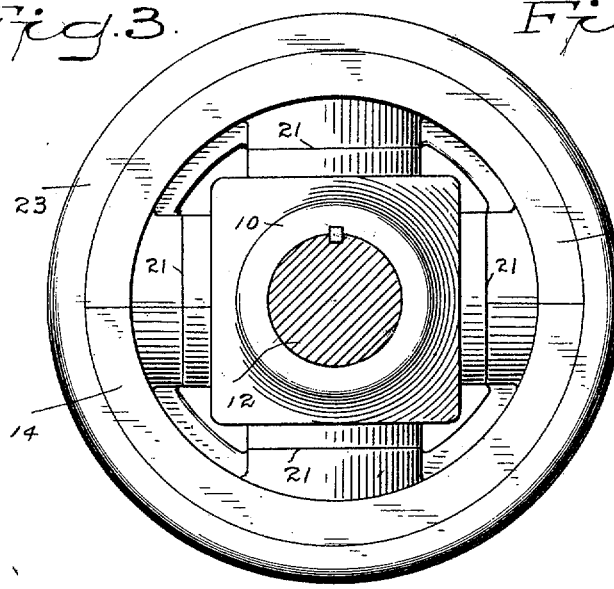
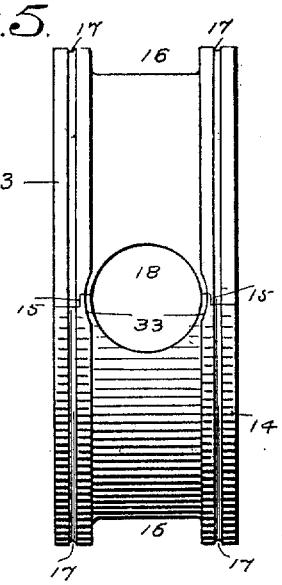
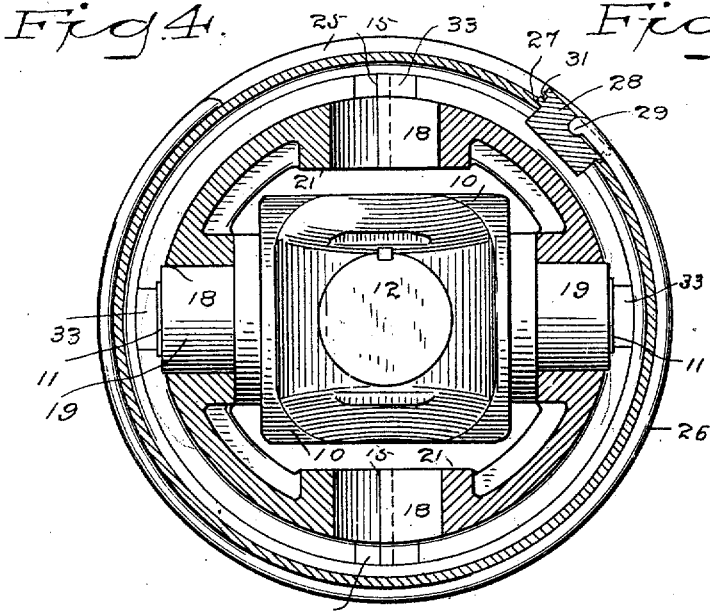
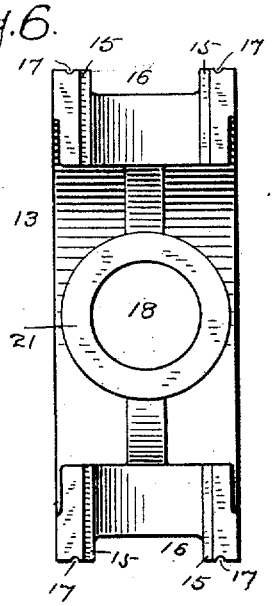
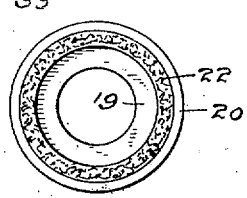
Witnesses:
H. A. Lamb.
S. W. Atherton.
Inventor
Charles A. Brewer
By Attorney

UNITED STATES PATENT OFFICE.

CHARLES A. BREWER, OF NOROTON HEIGHTS, CONNECTICUT.

UNIVERSAL JOINT.

No. 887,184.        Specification of Letters Patent.        Patented May 12, 1908.

Application filed August 23, 1907. Serial No. 389,811.

*To all whom it may concern:*

Be it known that I, CHARLES A. BREWER, a citizen of the United States, residing at Noroton Heights, county of Fairfield, State of Connecticut, have invented a new and useful Universal Joint, of which the following is a specification.

This invention relates to jointed shaft-couplings and has particular reference to that type of such devices which employs two forked shaft heads each having a pair of trunnions, the two pairs of trunnions being mounted in a coupling ring at a right angle to each other.

One of the objects of my invention is to provide a universal joint or shaft-coupling of this character in which all the bearings are dust and moisture proof, so that nothing detrimental to the working of the coupling can gain access to any inner part thereof.

Another object is to provide means for automatically lubricating all of the bearing surfaces of the joint, and to make the coupling oil tight so as to prevent the escape of any oil and therefore enable all of the lubricant to be utilized at the bearing surfaces.

Another object is to provide a universal joint or shaft coupling which requires no tools whatever for separating or assembling the parts thereof.

Other objects and features of my invention relate to strength, simplicity, durability and accessibility of parts, all as will appear more fully hereinafter.

To these ends, my invention consists in the construction and combination of parts substantially as hereinafter pointed out and claimed.

Figure 1:
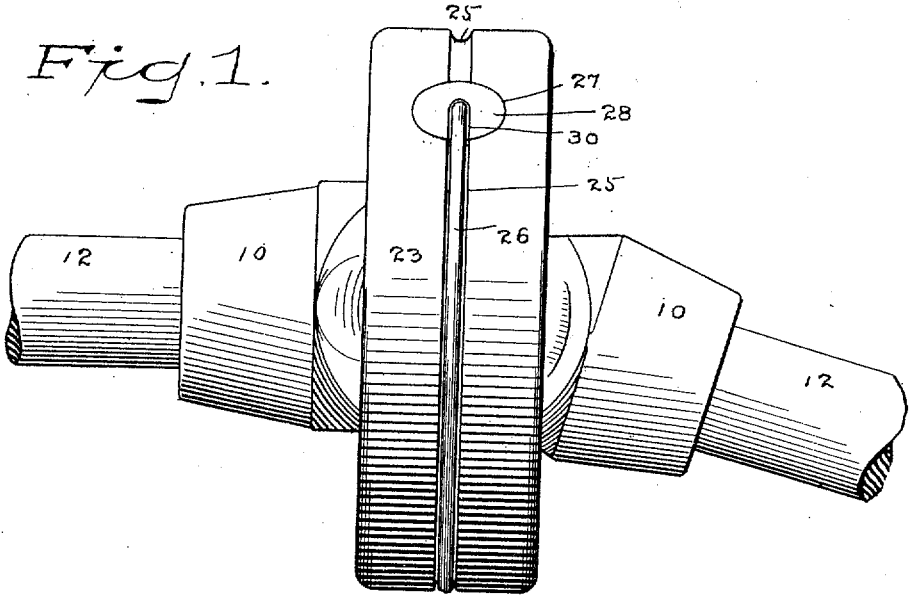
Figure 2:
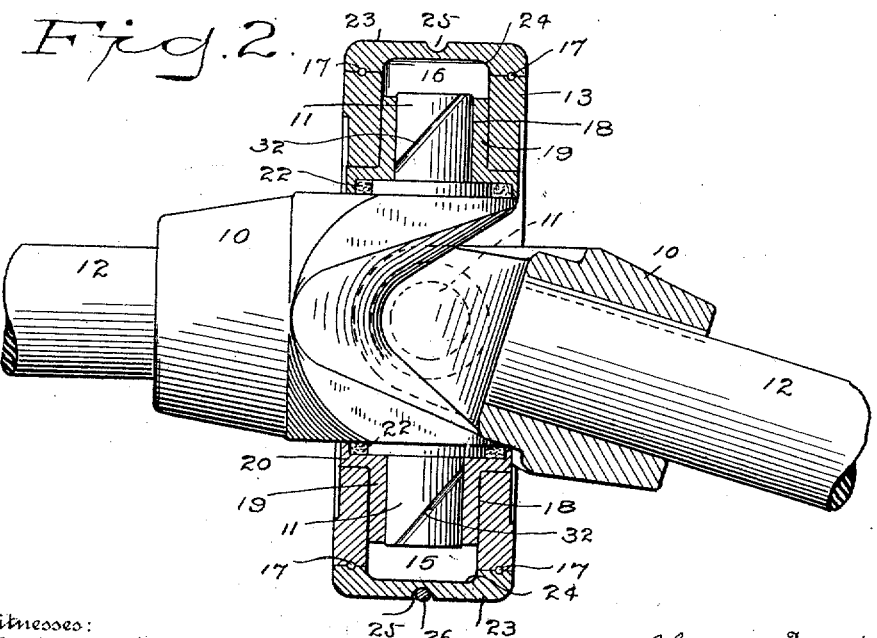

Of the accompanying drawings:—Figure 1 is a side elevation of a complete embodiment of my invention, including portions of two shafts which are coupled by the joint. Fig. 2 is a similar view, with parts in section. Fig. 3 is an elevation from the left of Fig. 1. Fig. 4 represents a transverse section through the coupling, one forked shaft head being removed. Fig. 5 is a detail elevation of the inner member of the casing or ring which couples the two shaft heads. Fig. 6 is a detail elevation of one of the halves of the casing member shown in Fig. 5. Fig. 7 is a detail end elevation of one of the bushings.

Similar reference characters indicate the same or similar parts in all of the views.

As best shown in Fig. 2, each shaft head 10 is forked and has two trunnions 11, said heads being formed to receive, and to be keyed on, shafts as indicated at 12. The casing or ring which couples the two heads together comprises inner and outer members. For convenience of description only, and without limiting myself by the use of such terms, I shall hereinafter refer to the inner member as the casing and the outer member as the ring.

The casing member, as best shown in Figs. 5 and 6, is composed of two halves 13, 14, the faces of which are dovetailed or tongue-and-grooved to fit each other, as indicated at 15. Said casing member is formed with an annular recess or groove 16 and with two smaller peripheral grooves 17, the purposes of which will be presently described, and with four equally-spaced radial openings 18 to receive the bushings 19. Two of the openings 18 are formed by opposing semi-cylindrical recesses in the abutting faces of the two halves of the casing.

The bushings 19 (see Figs. 2 and 4) receive the trunnions 11, and are formed with flanges 20 which rest on planed seats 21 formed at the inner ends of the openings 18, and the inner faces of said flanges are recessed to receive packing 22. As will be understood, the casing is made in two halves for convenience in assembling the same and the trunnioned shaft heads.

The outer member of the coupling, which holds the parts so far described assembled, consists of a ring 23 having an internal recess 24 registering with the recess 16 of the inner member to form a continuous annular oil chamber, said ring having also two small internal grooves registering with the grooves 17 of the inner member, and an external groove 25 which receives the spring 26 presently described. It is provided with an opening 27 (see Figs. 1 and 4) through which the oil-chamber may be filled, said opening being closed by a plug 28. The ring and plug are formed with coöperating seat and flange respectively to limit the inward movement of the plug, and the plug is held to its seat by the spring 26, said spring having an inturned end 29 forming a knob which engages a central recess or seat in the plug. Said knob and seat prevent the spring from slipping around in the groove. The plug has a radial groove 30 to accommodate the spring, said groove, as well as the groove 25, being of a depth to fully receive the spring. Each end of the spring is rounded so as to present nothing that would be liable to catch and result in twitching the spring away, said spring lying closely in the groove. The plug, when seated, extends in far enough so that its inner end will serve to prevent the ring from slipping off sidewise from the inner member or casing. Therefore, the parts, when assembled, are held without the aid of any screws, bolts, or other devices that require the use of tools to remove them. To separate all the parts, it is only necessary to unseat the spring from the plug, remove the plug (the latter having a groove 31 Fig. 4 which may be engaged by the finger nail), then slip the ring 23 sidewise off from the casing, and then all the parts will practically fall apart.

When the parts are assembled, the chamber formed by the opposing recesses 16 and 24 may be filled with oil which can then obtain direct access to the bearing surfaces of the trunnions, as clearly illustrated in Fig. 2. To aid the oil in flowing to all parts of the bearings, the trunnions may be formed with spiral grooves 32. But such oil cannot escape past the packing 22. Nor can dust or moisture gain access to the chamber or the bearings.

As shown in Figs. 4 and 5, the recess 16 in the inner member is enlarged laterally adjacent to each bearing, forming recesses 33. These recesses provide for a more positive feed of oil to the bearings when the device is rotating; they collect the lubricant and deliver it to the bearings. It will be understood that the ring 23 is formed to fit the periphery of the inner member as tightly as possible while still permitting it to be removed and replaced laterally. As some slight amount of oil might work out in spite of the tight fit, I have provided the grooves 17 before described, which, in conjunction with the opposing grooves in the ring, form small annular receptacles to catch and retain such lubricant as may find its way from the chamber formed by the recesses 16 and 24.

It will be apparent that my improved universal joint or shaft coupling is not only dust and moisture-proof, but is also strong and durable, provides for automatically lubricating the bearings without permitting any of the lubricant to escape, employs no fastenings that require the use of tools; the parts are easily and quickly accessible for cleaning or repairs; the bushing bearings may be easily replaced by new ones, and the joint or coupling as a whole receives its supply of lubricant at a single point by simply temporarily removing the plug.

Having now described my invention, I claim:

1. A device of the character described, comprising two trunnioned heads, and a coupling therefor consisting of inner and outer members having an annular lubricant chamber between them, the inner member comprising two halves with tongue-and-groove meeting faces and having trunnion bearings which communicate with the lubricant chamber, the outer member inclosing the two halves of the inner member and holding them assembled, annular receptacles to catch or detain escaping oil being formed each side of the lubricant chamber.

2. A device of the character described, comprising two trunnioned heads, and a coupling therefor consisting of inner and outer members having an annular lubricant chamber between them, the inner member being formed of two parts and having radial openings communicating with said chamber, the trunnions of the heads being supported in said openings, removable bushings being mounted in said openings and providing bearings for the trunnions, packing being interposed between the inner ends of the bushing and the opposing faces of the heads and surrounding the trunnions.

3. A device of the character described, comprising two trunnioned heads, a coupling therefor consisting of an inner member having bearings for the trunnions of the heads and an outer member inclosing the inner member, an annular lubricant chamber being formed between said members, the outer member having an opening, a plug for closing the said opening, said plug extending into the lubricant chamber, the outer member having an external groove, and a spring lying in said groove and bearing at one end on said plug to retain it in position.

4. A universal joint or shaft coupling, comprising two forked heads having trunnions, a coupling therefor consisting of an inner member formed in two halves and having bushed openings to receive said trunnions and formed with an annular external recess, an outer ring member having an annular recess and an opening and an external groove, a plug to close said opening, and a spring lying in the external groove of the outer member and bearing at one end on the plug, the inner end of the plug extending into the recess of the inner member.

5. A universal joint or shaft coupling, comprising two forked heads having trunnions, a coupling therefor consisting of an inner member formed in two halves and having bushed openings to receive said trunnions and formed with an annular external recess, an outer ring member having an annular recess and an opening and an external groove, a plug to close said opening, and a spring lying in the external groove of the outer member and bearing at one end on the plug, the inner end of the plug extending into the recess of the inner member, small annular grooves being formed in the meeting surfaces of the inner and outer members, and packing surrounding the trunnions at the inner ends of the bushings.

In testimony whereof I affix my signature, in presence of two witnesses.

CHARLES A. BREWER.

Witnesses:
CARL E. KROG,
C. S. PURDY.